Patented Oct. 29, 1929

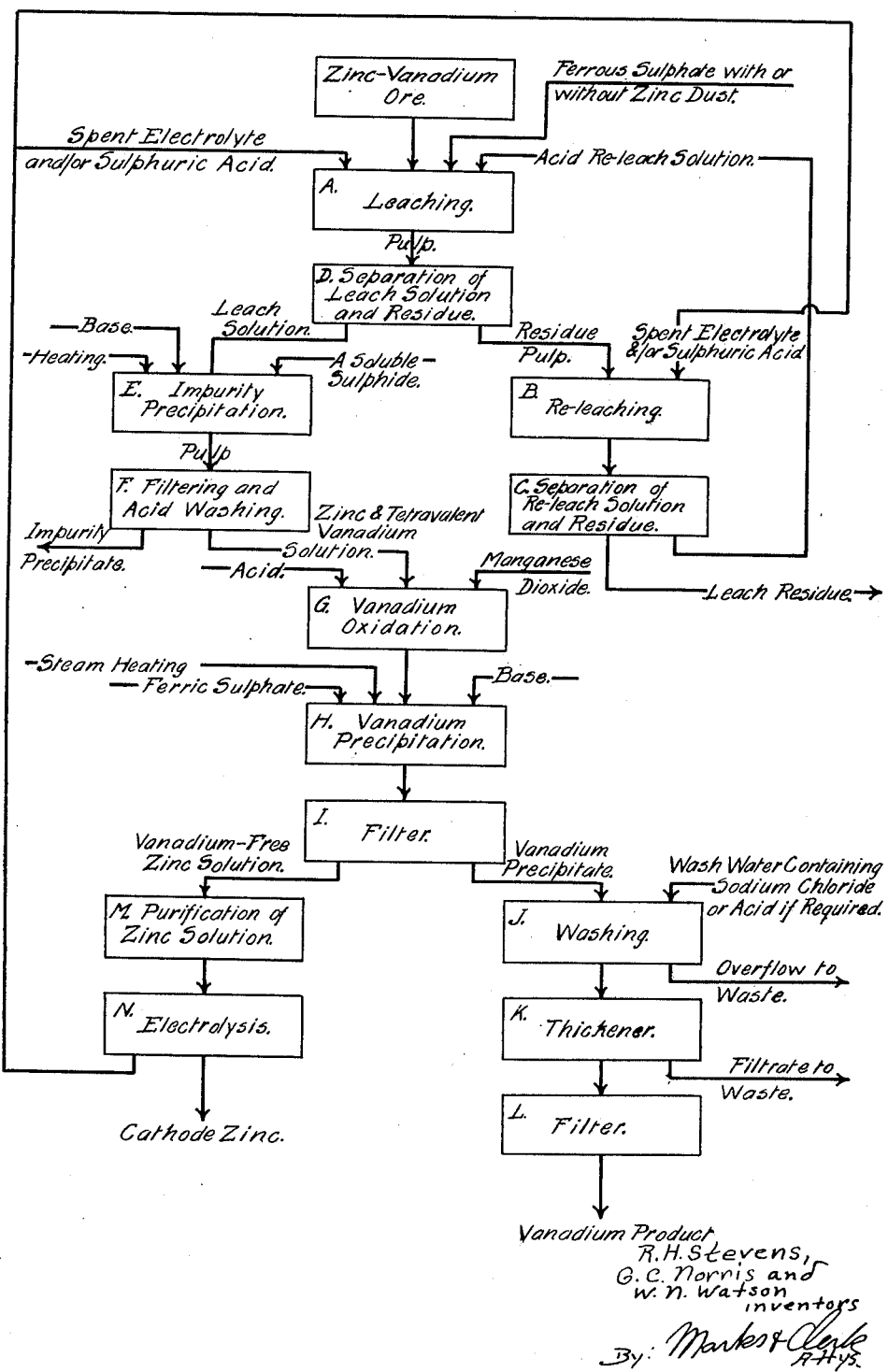

1,733,700

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, SOUTH AFRICA, ASSIGNORS TO RHODESIA BROKEN HILL DEVELOPMENT COMPANY, LIMITED, OF BROKEN HILL, NORTHERN RHODESIA

RECOVERY OF VANADIUM

Application filed September 24, 1926, Serial No. 137,620, and in the Union of South Africa April 7, 1926.

The present invention relates to the recovery of vanadium from ores and metallurgical products.

A purpose of the invention is to provide means for effectively removing impurities from solutions obtained by treating vanadium bearing material with sulphuric acid, alkaline sulphates or bisulphates or any other compound of monosulphuric acid which would yield a sulphate solution of the vanadium, without excessive loss of vanadium in the impurity precipitate.

Another purpose of the invention is to effect the substantially complete recovery of vanadium from solutions such as those aforesaid, in the form of a high grade product. Said product may, as desired, be in a form suitable for direct furnace treatment for the manufacture of ferro-vanadium or alternatively in a form well adapted for further treatment for the manufacture of vanadium oxide.

A further purpose of the invention is to provide a vanadium purification and recovery method which can be incorporated in the usual cycle of operations for the electrolytic recovery of zinc, whereby both a commercial vanadium product and metallic zinc may be obtained from zinc-vanadium ores and metallurgical products.

According to the invention the vanadium in sulphate solution is converted to a form more soluble than that in which it normally occurs in the ores and in which it normally enters sulphate solutions, preparatory to the precipitation of the impurities. After the impurities are removed from the solution the vanadium is converted to a less soluble form to facilitate its precipitation. Precipitation is effected by treating the solution with a ferric compound and neutralizing it by addition of basic material, or if a ferric compound is already present, the solution is simply neutralized by means of basic material.

By using the requisite quantity of the ferric compound, and only so much base as is necessary to neutralize the acid liberated by the reaction of the vanadic acid with the ferric compound, the vanadium is precipitated wholly as a ferric vanadate. On the other hand, by using less of the ferric compound and more of the base, the amount of iron in the vanadium precipitate may be adjusted to suit the eventual treatment of the vanadium product. In any case the addition of the ferric compound enables the vanadium to be precipitated by the addition of considerably less base and in a shorter period of time than would otherwise be necessary. If the solution from which the vanadium is precipitated contains zinc in sufficient quantity, the vanadium precipitate, except in so far as it consists of iron vanadate, consists of a vanadate of zinc, whatever base is employed.

The precipitation of vanadium is materially hastened and the amount of the reagents required is reduced by effecting the precipitation at an elevated temperature, a temperature of about 50° C. being preferred for economic reasons.

The invention will be further described as applied to the recovery of vanadium from zinc-vanadium ores, from which also the zinc is to be recovered by the electrolytic method, reference being made to the accompanying flow sheet.

The suitably comminuted ore is leached in step A with sulphuric acid in the form of spent electrolyte from the electrolytic cells, strengthened as may be necessary with fresh acid. The dissolving of the vanadium is preferably completed in step B by re-leaching the first leach residue with acid of relatively high concentration, the acid releach solution being returned from the separation step C to the first leaching step, as described in the application for Letters Patent for vanadium leaching.

When leaching has been completed the leach solution separated at D is neutralized by addition of a suitable base, to effect the precipitation of silica, iron, alumina and any other impurities which are precipitated by such treatment. Prior to this step, however, the vanadium in the solution is reduced from the pentavalent form in which it normally occurs in zinc-vanadium ores, to the more soluble tetravalent form, so as to minimize losses of vanadium through its being precipitated with the aforesaid impurities. Such reduction of the vanadium is conveniently effected by adding a reducing substance, such as ferrous sulphate or ferrous sulphite, to the solution during or subsequent to the leaching operation. The ferrous sulphate solution is added until the leach solution gives a test for ferrous iron by the usual "ferricyanide" spot test. The presence of ferrous iron indicates that all vanadium is reduced to the tetravalent form.

When the ore contains large amounts of vanadium, it may be undesirable to use ferrous sulphate or ferrous sulphite for reducing the whole of the vanadium, owing to the consequent introduction of unduly large amounts of iron into the solution. In such a case it is preferable to reduce the greater part of the vanadium with zinc dust or other reducing agent which would not introduce undesired impurities into the zinc sulphate solution, and to complete the reduction by ferrous sulphate.

The separated leach solution is neutralized in step E by addition of a base such as zinc oxide, oxide zinc ore, lime, or finely ground limestone; rather more being added than is necessary to neutralize free acid and to render the solution neutral to test with methyl orange indicator.

If copper is present, it is removed at this stage to prevent its being later precipitated with the vanadium. It may be precipitated by addition of a soluble sulphide after the solution has been neutralized; and separated from the solution together with the silica, iron and other impurities precipitated by treatment with a base.

Phosphorus if present in the solution may be removed with the other impurities at this stage according to the method described in application for Letters Patent for phosphorus 137,622.

Some vanadium may be precipitated with the silica etc., but owing to its being in the tetravalent form practically the whole of the vanadium so entering the impurity precipitate is recoverable by washing the precipitate with weak acid washes. Such washing is most conveniently effected by forming the precipitate as a filter cake in step F and maintaining the cake while subjecting it to counter-current acid washing by filtering weak acid liquors through the cake in several steps as described in application for Letters Patent 137,621 for silica. The filtrate from the later steps is used as the wash solution in earlier steps, and acid is added at an intermediate step in the washing process; the acid additions being so controlled that the first or strongest wash filtrate comes through neutral or slightly acid. The first or strong wash filtrate is added to the main bulk solution originally separated from the silica impurity precipitate.

The mpurities which would otherwise affect the grade and purity of the vanadium having now been removed, the solution is treated to convert the vanadium from the tetravalent condition to a less soluble condition favourable for its precipitation from the solution. For this purpose the vanadium may be further reduced to the trivalent form by the addition of an active reducing agent such as zinc dust.

Alternatively the vanadium may be re-oxidized to the pentavalent condition as indicated in step G. The oxidation of the tetravalent vanadium is effected by first adding sufficient acid to the solution to obtain an acidity of 2 to 5 grams free acid per litre, the acid being added in the form of spent electrolyte or sulphuric acid. Manganese mud from the electrolyzing cells or finely ground manganese ore is then added, and the solution is agitated with an excess of the manganese di-oxide bearing material until a "permanganate" titration shows that substantially all tetravalent vanadium has been oxidized. After oxidation has been completed, the agitation is stopped and the excess manganese di-oxide bearing material is allowed to settle. The supernatant solution is then passed to the vanadium precipitation step H and the settled manganese di-oxide bearing material is re-used along with fresh material for treating the next charge.

It is convenient to add a ferrous compound, such as ferrous sulphate to the solution at or before the oxidizing step G; the result being that such ferrous compound is oxidized in said step G to the ferric condition and is then available as the ferric compound required in the next step.

After oxidation of the vanadium, the slightly acid solution in which the vanadium is now present in the pentavalent condition is ready for precipitation of the vanadium in step H. The ferric compound, such as ferric sulphate, is added, if it has not already been produced in the solution as mentioned above, and the solution is neutralized by addition of a base such as zinc oxide, dross, lime or limestone, at an elevated temperature preferably about 50° C., the operation being preferably carried out in a tank employing mechanical agitation in order to conserve heat in the solution. Zinc, being a metal which does not form an insoluble ferric compound under basic conditions, is not precipitated with the vanadium.

The pulp is now filtered and the filter cake washed in step I. The filtrate, which contains the zinc, may then be further purified as required in step M, and the solution finally electrolyzed for the deposition of metallic zinc in step N.

The vanadium precipitate is liable to contain sulphates, particularly when lime or limestone has been used for neutralizing the solution. For the production of ferrovanadium it is important that sulphur should be eliminated from the vanadium product and accordingly the vanadium precipitate is washed in step J appropriately to dissolve gypsum. If fresh water is available in sufficient quantities, it may be used for the purpose, the solubility of gypsum in fresh water being taken at 1.5 to 2 grams per litre of water for the purpose of determining the volume of water required.

Alternatively there is used a solution of sodium chloride, such as natural brack water or seawater, in which gypsum is rather more soluble than in fresh water.

If the vanadium precipitate contains basic sulphates or other basic compounds, the wash liquor is acidified to the requisite extent to render the basic compounds soluble without substantially dissolving vanadium.

The washing operation is preferably carried out in a series of tanks employing mechanical agitation of the solution, the operation being continuous. The vanadium precipitate and water are fed in regulated amounts at the first tank of the series, and overflow into each successive tank; there being, for example, three tanks in series, the combined capacity of which is such that the vanadium precipitate is subjected to washing for a period of two hours.

The pulp is now thickened in step K and filtered in step L, the overflow from the thickeners and the filtrate from the filters going to waste. The resulting filter cake is a vanadium product of grade suitable for the manufacture of ferro-vanadium or vanadium oxide.

When the product is intended for the manufacture of ferro-vanadium it is desirable that the amount of iron in it should be capable of variation as required; and this is readily effected by suitably proportioning the amounts of the ferric compound and the base added or present in the vanadium precipitation step.

We claim:—

1. The process of purifying an impure vanadium containing solution of the kind obtained by leaching vanadium-bearing ore with dilute acid sulphate liquor, from which solution vanadium could be precipitated directly by addition of a base, which consists in converting the vanadium to the tetravalent condition, treating the solution with basic material and thereby precipitating impurities while the vanadium remains in solution, removing the impurity precipitate, thereafter changing the valency of the vanadium, and precipitating the vanadium from the solution.

2. The process of purifying an impure solution of pentavalent vanadium of the kind obtained by leaching vanadium-bearing ore with dilute acid sulphate liquor, from which solution vanadium could be precipitated directly by addition of a base, which consists in converting the vanadium to the tetravalent condition, treating the solution with basic material and thereby precipitating impurities while the vanadium remains in solution, removing the impurity precipitate, thereafter changing the valency of the vanadium, and precipitating the vanadium from the solution.

3. The process of treating sulphate solutions of pentavalent vanadium by adding thereto a ferrous compound, precipitating impurities from the solution, changing the valency of the vanadium, and precipitating the vanadium from the solution.

4. The process of treating sulphate solutions of pentavalent vanadium, which consists in adding thereto a ferrous compound and another reducing agent, precipitating impurities from the solution, changing the valency of the vanadium, and precipitating the vanadium from the solution.

5. The process of treating sulphate solutions containing pentavalent vanadium and another valuable metal, which consists in treating the solution with a ferrous compound and another reducing agent which does not introduce into the solution constituents detrimental to the recovery of the vanadium and the other valuable metal, precipitating impurities from the solution, changing the valency of the vanadium in the solution and precipitating vanadium from the solution.

6. The process of treating sulphate solutions of vanadium which consists in increasing the solubility of the vanadium in the solution, precipitating impurities from the solution, oxidizing the vanadium in the presence of free acid equivalent to 2 to 5 grams free sulphuric acid per litre, and precipitating the vanadium from the solution.

7. The process of precipitating vanadium from solutions containing free vanadic acid, and in which a ferric compound is present, which consists in adding a basic substance and thereby neutralizing the solution.

8. The process of treating a solution containing vanadium in the tetravalent condition which consists in converting the vanadium to the pentavalent condition and, in the presence of a ferric compound, neutralizing the solution by means of a basic substance and thereby precipitating the vanadium.

9. The process of treating a solution containing free vanadic acid and impurities detrimental to the eventual vanadium precipitate, which consists in first removing the impurities and thereafter, in the presence of a ferric compound, neutralizing the solution by means of a basic substance and thereby precipitating the vanadium.

10. The process of treating a solution containing free vanadic acid and phosphorus, which consists in first removing the phosphorus and thereafter, in the presence of a ferric compound, neutralizing the solution by means of a basic substance and thereby precipitating the vanadium.

11. The process of treating a solution containing vanadium and impurities detrimental to the eventual vanadium precipitate, which consists in precipitating the impurities while the vanadium is in the tetravalent conditon, oxdizing the vanadium, and thereafter, in the presence of a ferric compound, neutralizing the solution by means of a base and thereby precipitating the vanadium.

12. The process of precipitating vanadium from solutions containing free vanadic acid, and in which a ferric compound is present, which consists in heating the solution and adding a base to neutralize the solution.

13. The process of precipitating vanadium from solutions containing free vanadic acid and a ferric compound, which consists in treating the solution with sufficient basic material to neutralize the solution, the relative amounts of the ferric compound and the basic material being so adjusted that the vanadium is precipitated partly as a ferric vanadate and partly as another vanadium compound.

14. The process which consists in oxidizing a solution containing vanadium and a ferrous compound, and then neutralizing the solution by addition of basic material and thereby precipitating the vanadium.

15. The process which consists in adding a ferrous compound to a solution containing vanadium in the tetravalent condition, oxidizing the solution, and then neutralizing the solution by addition of a basic material and thereby precipitating the vanadium.

16. The process which consists in adding a reducing agent to an acid sulphate solution of pentavalent vanadium so as to convert the vanadium to the tetravalent condition, neutralizing the solution by means of a basic substance and thereby precipitating impurities, separating the solution from the precipitate, acid washing the precipitate and thereby recovering vanadium therefrom, adding the resulting wash liquor to the solution, acidifying the solution, oxidizing the vanadium therein, neutralizing the solution in the presence of a ferric compound by means of a basic substance and thereby precipitating the vanadium, separating the vanadium precipitate from the solution, and removing sulphates from the vanadium precipitate.

17. The process of treating a solution containing vanadium and another metal which does not form an insoluble ferric compound under basic conditions, for the purpose of separately recovering the vanadium and said other metal, the said process consisting in converting the vanadium to the tetravalent condition, treating the solution with basic material thereby precipitating impurities from the solution while the vanadium remains in solution, altering the valency of the vanadium, precipitating the vanadium, removing the vanadium precipitate, and treating the solution for recovery of the other metal.

18. The process of treating a sulphate solution containing vanadium and zinc, which consist in converting the vanadium to the tetravalent condition, treating the solution for precipitation of impurities detrimental to the vanadium and zinc by a step involving neutralization of the solution, separating the precipitates from the solution, acid washing the precipitate for recovery of residual vanadium and zinc therefrom, separating the wash solution from the precipitate, altering the valency of the vanadium, precipitating the vanadium from the solution, separating the solution from the vanadium precipitate, treating the vanadium precipitate for removal of sulphates, further purifying the remaining solution, and electrolyzing the same for recovery of zinc.

In testimony whereof we affix our signatures.

ROYALE HILLMAN STEVENS.
GERALD CHAD NORRIS.
WILLIAM NELSON WATSON.

CERTIFICATE OF CORRECTION.

Patent No. 1,733,700.             Granted October 29, 1929, to

ROYALE HILLMAN STEVENS ET AL.

It is hereby certified that error appears in the above numbered patent requiring correction as follows: Page 1, in the heading to the printed specification, line 7, application filing clause for "Union of South Africa" read Southern Rhodesia; and that the said Letters Patent should be read with this correction therein that the same may conform to the record of the case in the Patent Office.

Signed and sealed this 17th day of March, A. D. 1931.

(Seal)                                        M. J. Moore,
                                             Acting Commissioner of Patents.